INVENTORS
ROBERT J. GREENLER
ROBERT J. THOMPSON
BY

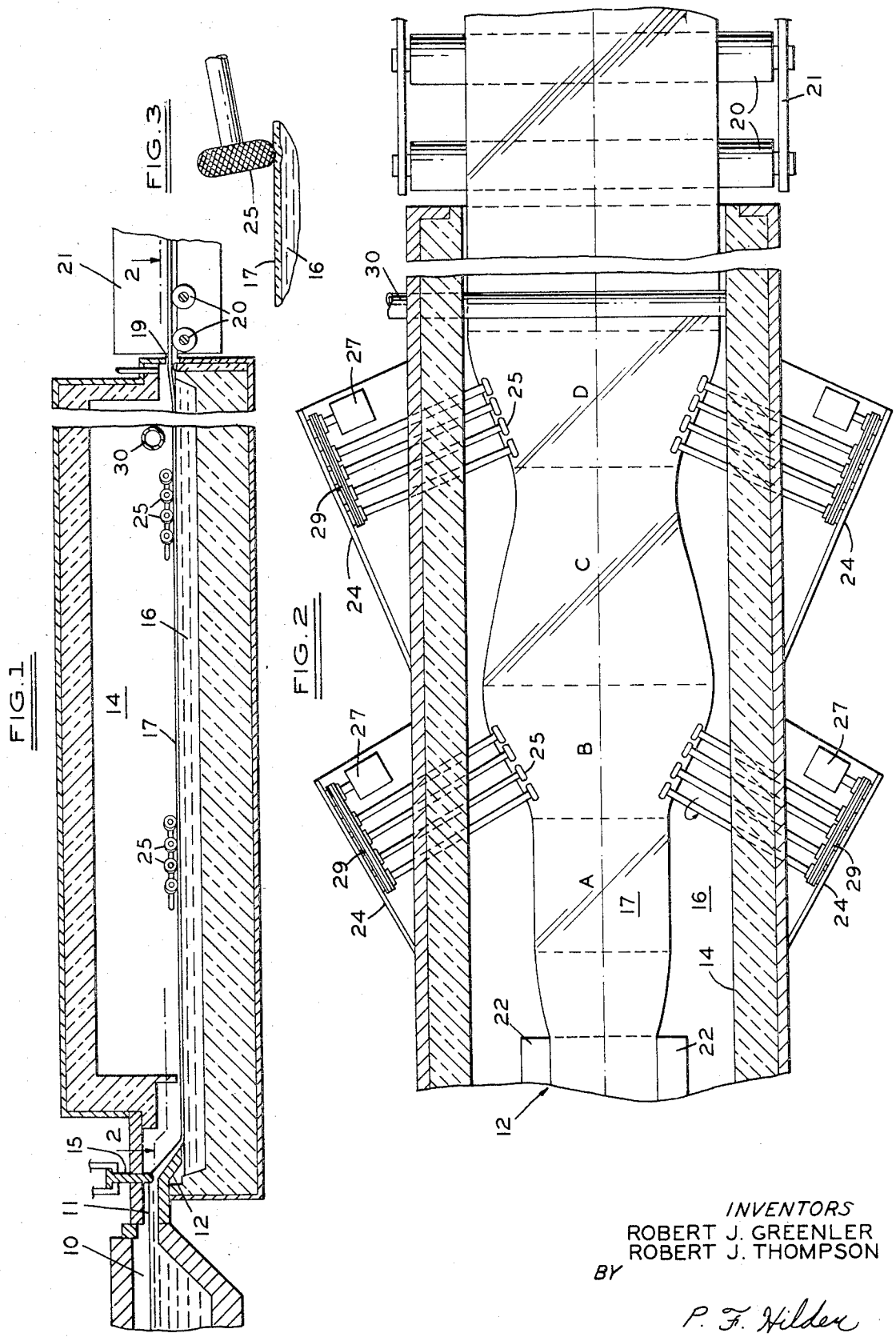
INVENTORS
ROBERT J. GREENLER
ROBERT J. THOMPSON
BY
*P. F. Hilder*
ATTORNEY

*P. F. Hilder*
ATTORNEY

United States Patent Office 3,520,672
Patented July 14, 1970

---

3,520,672
METHOD OF LATERALLY STRETCHING FLOAT GLASS UTILIZING KNURLED ROLLS
Robert J. Greenler, Nashville, Tenn., and Robert J. Thompson, Flat Rock, Mich., assignors to Ford Motor Company, Dearborn, Mich., a corporation of Delaware
Continuation of application Ser. No. 482,510, Aug. 25, 1965. This application Sept. 11, 1968, Ser. No. 759,824
Int. Cl. C03b *18/02*
U.S. Cl. 65—91                                  6 Claims

ABSTRACT OF THE DISCLOSURE

A method of producing glass of less than equilibrium thickness has the following steps. A prescribed quantity of molten glass is continuously delivered to a molten metal bath contained within a glass processing chamber. The glass is flowed out upon the metal bath toward a condition of equilibrium thickness, the flow-out of the glass forming a ribbon of width controlled by the quantity of glass delivered to the chamber. The glass ribbon is laterally stretched to a width greater than the controlled width thereby to decrease the thickness of the glass to a thickness less than equilibrium. The lateral stretching is performed by a set of knurled rolls engaging opposite lateral edges of the glass ribbon only on the surface of the ribbon away from the molten metal both in directions diverging from the centerline of the glass ribbon. These knurled rolls are rotated at a peripheral speed at least slightly greater than the linear speed of the movement of the glass ribbon. The ribbon is cooled and removed from the glass processing chamber to form a self-supporting glass sheet of less than equilibrium thickness.

---

This application is a continuation of application Ser. No. 482,510, filed Aug. 25, 1965, and now abandoned.

This invention relates to the manufacture of glass by the float process.

In the manufacture of glass by the float process, a continuous ribbon of initially molten glass is formed on the surface of a molten metal bath, the glass being soft enough to flow or fire-polish so as to even out surface irregularities. In one form of the process, the glass is permitted to flow laterally under the influence of gravity and surface tension to an equilibrium thickness of about 0.280 inch. The ribbon then is cooled as it moves along the metal bath until at the end of the bath it has hardened enough to be conveyed by rollers without injuring the surface of the glass.

Glass of less than equilibrium thickness may be formed by longitudinally attenuating the ribbon while it is still soft. If, however, the edges of the ribbon are laterally unrestrained during attenuation, the ribbon will be narrowed in about the same percentage as the reduction in thickness. For example, if ⅛″ (about 0.125″) glass is to be made, the ribbon must be stretched nearly four times its original length. If the ribbon is being formed on the metal bath at about 160 inches per minute, the ribbon discharge speed from the process will be at least about 550 inches per minute. This large degree of longitudinal stretch tends to magnify any minor imperfections of the glass. Moreover, the narrower ribbon results in a lower yield of usable glass because the edge trim is a higher portion of total width and because a narrow ribbon cannot be as effectively cut into commercially usable rectangles as can a wider ribbon.

In addition, the extreme degree of longitudinal stretch required to obtain ⅛″ glass by the above method frequently results in visual distortion in the glass produced by minor nonuniformity of temperature or composition so as to produce glass of not completely uniform thickness and minor nonparallelism or the opposite races.

It has been suggested in U.S. Pat. 3,083,551 to hold the width of the ribbon constant after equilibrium flow has occured while longitudinally stretching it in order to make glass of less than equilibrium thickness. Manufacture of ⅛″ glass by this method still requires stretching the ribbon to more than twice its original length and has all of the drawbacks of the above-discussed method, though in lesser degree.

According to the present invention, the ribbon, after forming and after being permitted to flow to true parallelism of the faces, is laterally stretched to produce glass thinner than equilibrium thickness. The lateral stretch preferably is accompanied by a simultaneous or subsequent longitudinal stretch. To the degree that the ribbon is laterally stretched, the exit speed of the ribbon is not increased by reduction in thickness, thus simplifying cutting procedures and reducing distortion due to excessive longitudinal stretch. By stretching both laterally and longitudinally, the percentage of longitudinal stretch is greatly reduced, thereby yielding glass of better quality.

Lateral attenuation of the ribbon is accomplished by one or more series of power-driven knurled rolls spaced along the length of the ribbon and rotating in a plane outwardly divergent from the center line of the ribbon on the discharge side of the rolls. These rolls are located above the marginal edges of the ribbon and bear against the upper surface of the ribbon to press it down slightly against the tin bath in order to obtain the necessary traction against the glass.

The rolls are arranged in pairs, the individual rolls of each pair being located at opposite sides of the ribbon. The rolls are driven at a linear speed that preferably is increased at least slightly towards the discharge end to maintain the ribbon under longitudinal tension at all times to prevent buckling. Each successive pair of rolls laterally stretches the ribbon, the next succeeding pair of rolls being spaced from the preceding pair to engage the ribbon before the influence of the preceding pair of rolls has been overcome by the inherent tedency of the glass to flow to equilibrium thickness. Preferably, the pairs of rolls are closely spaced in gangs or groups of two or more rolls at each side of the ribbon.

Among the objects of the present invention are to provide a method and apparatus for the manufacture of float glass in which the ribbon of glass is stretched laterally to produce glass of less than equilibrium thickness; to provide such a process embodying combinations of lateral and longitudinal stretching to produce such glass; to provide an improved roll assembly for laterally stretching the glass ribbon; and generally to improve processes and apparatus of the type described.

Other objects, and objects relating to details of construction will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming a part of this specification in which:

FIG. 1 is a diagrammatic vertical longitudinal section through a chamber for manufacture of float glass, the delivery end of the melting and refining tank and the entrance end of the annealing lehr being shown.

FIG. 2 is a diagrammatic horizontal section taken generally along the line 2—2 of FIG. 1.

FIG. 3 is a fragmentary elevation of one of the knurled rolls, the ribbon and the molten metal bath being shown in vertical section.

Figure 4:
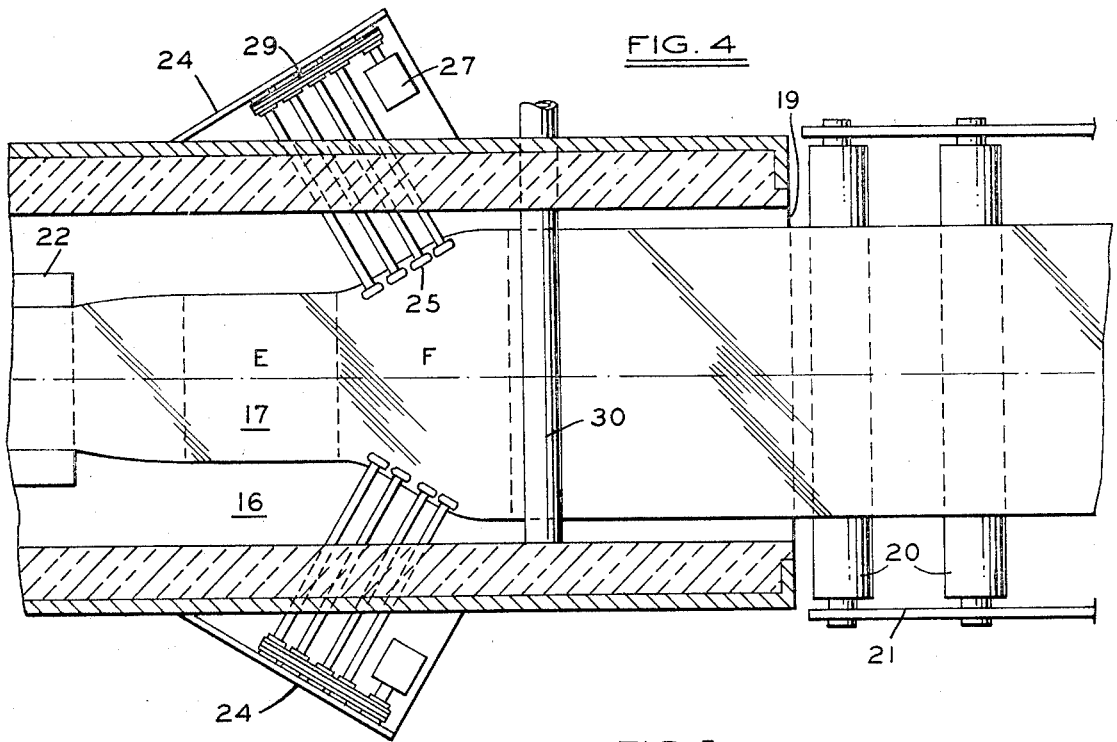
FIG. 4 is a view similar to FIG. 2 in which only a single group of knurled rolls are located at each side of the ribbon.

Referring now to the drawings, the refining end 10 of a glass furnace is shown at the left of FIG. 1, the glass at this station being at a temperature of about 2300° F. The glass furnace and its refining end 10 may be conventional in design and generally similar to glass furnaces for manufacturing rough plate.

A channel or spout 11 and ramp 12 are provided at the entrance end of the chamber 14 for delivering molten glass by gravity at a uniform rate from the furnace to the chamber. A gate 15 is provided in the spout 11 to control the rate of glass delivered.

The chamber 14, which may be generally similar to the chamber described in Basler et al. U.S. application 409,664 filed Nov. 9, 1964, and now abandoned is an enclosed, refractory-lined chamber containing a body 16 of molten metal, preferably tin. The glass delivered from the ramp 12 forms a continuous ribbon 17 of initially molten glass extending for the length of the chamber. The ribbon 17 exits through an opening 19 at the right end of the chamber 14 and onto a series of power-driven conveyor rolls 20 of an annealing lehr 21.

The ribbon 17, when formed at the lower end of the ramp 12, is quite fluid and flows until there is true parallelism of the upper and lower faces of the ribbon and uniform thickness. Preferably, this flow is permittted to take place after the ribbon has exited from the confining side walls 22—22 of the ramp, the glass flowing laterally unhindered on the tin to form a so-called "equilibrium thickness" under the influence of gravity and surface tension, as described in Pilkington U.S. Pat. 3,083,551.

FIG. 2 discloses one method of laterally stretching the ribbon 17 to produce glass of less than equilibrium thickness. In this form of the invention, the ribbon in zone A is permitted to flow laterally unrestrained under the influence of surface tension and gravity, the two faces of the glass flowing to true parallelism and surface irregularities being evened out.

In zone B, the ribbon is laterally stretched by a group 24 of knurled rolls engaging the upper face of the ribbon along each marginal edge. Each knurled roll 25 (see FIG. 3) presses the ribbon down slightly against the tin to secure adequate traction. The peripheral surface 26 of each roll is knurled or otherwise roughened to increase tractive engagement with the glass. The knurled rolls may be cooled by circulating water (not shown) in a known manner in order to prevent the glass from adhering to the rolls.

Each group 24 of knurled rolls consists of a plurality of rolls rotated on generally parallel axes, the rolls revolving generally in a plane diverging from the center line of the ribbon on the discharge side. A second group 24 of knurled rolls is located precisely opposite the first group and is similarly arranged. The combined action of these two opposite groups of rolls is to draw the marginal edge of the ribbon outwardly to laterally stretch the ribbon in the zone B, as indicated. The forward component (along the center line of the glass) of the peripheral speed of the rolls is chosen so as not to substantially accelerate the ribbon but merely to laterally stretch the ribbon between the two groups of rolls. Each roll of the group is driven at the same speed, preferably by an electric motor 27, the speed of which can be very accurately controlled, and a drive chain 29.

The spacing between adjacent rolls 25 is selected so that the margin of the ribbon, which has a tendency to turn towards the center line of the ribbon due to inherent tendency of the ribbon to return to the original width and thickness of zone A of the ribbon, will not have an opportunity to change substantially its direction imparted by the preceding roll before being engaged by the next succeeding roll. To accomplish this, a series of rolls are placed in close proximity, preferably being separated by less than one roll diameter.

A succeeding group 24 of knurled rolls, which may be similar to the group just described, is located on each side of the ribbon 17 near the exit opening 19 of chamber 14. The second set 24 of knurled rolls preferably is driven at a somewhat higher peripheral speed in order to longitudinally stretch the ribbon 17 in the zone C. This results in a decrease in width as well as thickness of the ribbon in zone C, and coupled with this is an inherent tendency of the ribbon to return to equilibrium width and thickness, resulting in a substantial necking down of the ribbon in this zone. The flow to equilibrium, however, is retarded as compared to zone A inasmuch as the ribbon in zone C is substantially cooler than at A and, therefore, more viscous and not as free flowing.

In zone D, the ribbon is again laterally stretched as in zone B and in the same manner. Immediately following zone D, a cooler 30 extending transversely above the ribbon 17 serves to cool the ribbon sufficiently to prevent the ribbon from again narrowing due to its inherent tendency to return to equilibrium thickness. The ribbon then is progressed at uniform speed from zone D to the exit opening 19 of the chamber. During this time, the temperature of the ribbon is continually decreased until, at the end of the bath, it has hardened sufficiently to be conveyed by rollers without injuring the surface of the glass.

After the ribbon 17 has excited from the chamber 14, it immediately enters an annealing lehr 21 in which the ribbon undergoes controlled cooling to relieve stresses, after which the ribbon can be cut in a known manner.

In the form of the invention shown in FIG. 4, a single series of knurled rolls is used, consisting of a group 24 of knurled rolls on each side of the ribbon 17. The rolls are positioned to engage the ribbon after it has floated on the tin long enough so that the opposite faces have flowed to true parallelism and healed any surface irregularities. Preferably, the ribbon has flowed to substantially equilibrium thickness in the zone E.

In zone F of FIG. 4, the ribbon 17 has been laterally stretched by the groups of knurled rolls 24, the forward speed of the ribbon not being substantially increased. Immediately following the zone F of lateral stretching, the cooler 30 is located to cool the ribbon rapidly and prevent its return towards equilibrium thickness. The ribbon is then further cooled and taken from the chamber 14 as above described in connection with FIG. 2.

Figure 5:
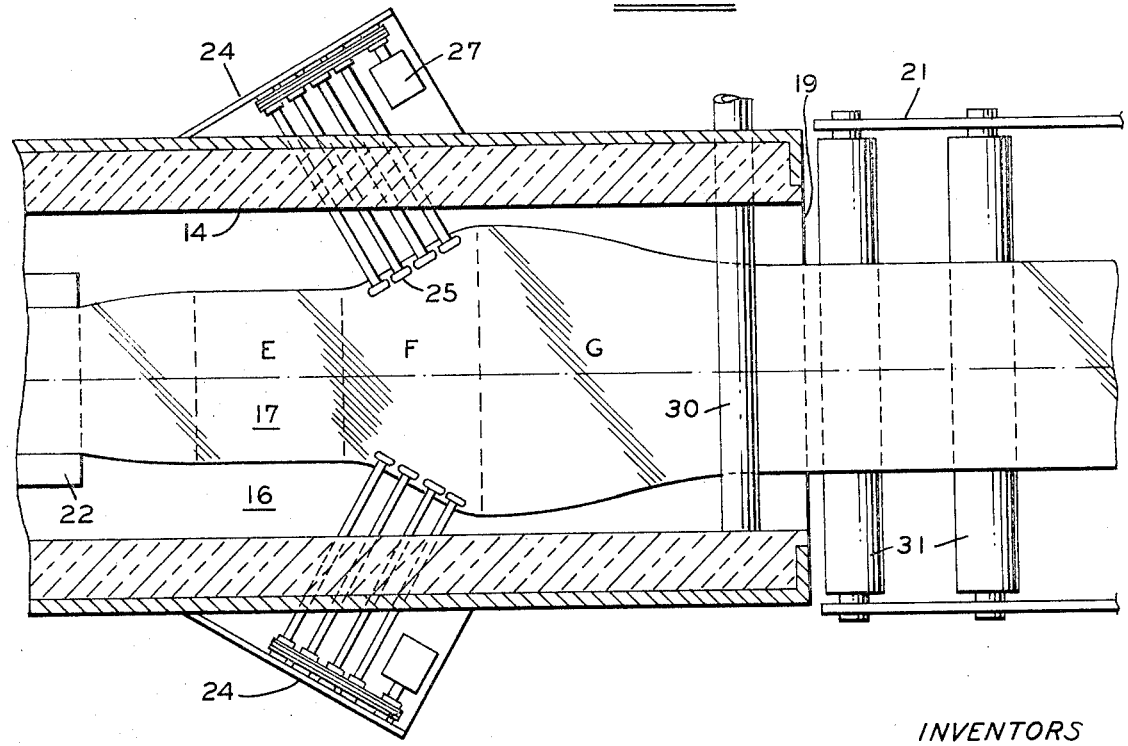
FIG. 5 is a view similar to FIG. 4 in which there is longitudinal stretching of the ribbon following lateral stretching.

In the method shown in FIG. 5, the ribbon 17 first is laterally stretched as in the method of FIG. 4. Following the lateral stretch, the ribbon is longitudinally stretched by increasing the peripheral speed of the rolls 31 within the annnealing lehr 21. This results in a reduction in both width and thickness in the zone G of the ribbon, the ribbon preferably still being wider than it was when at equilibrium thickness.

Figure 6:
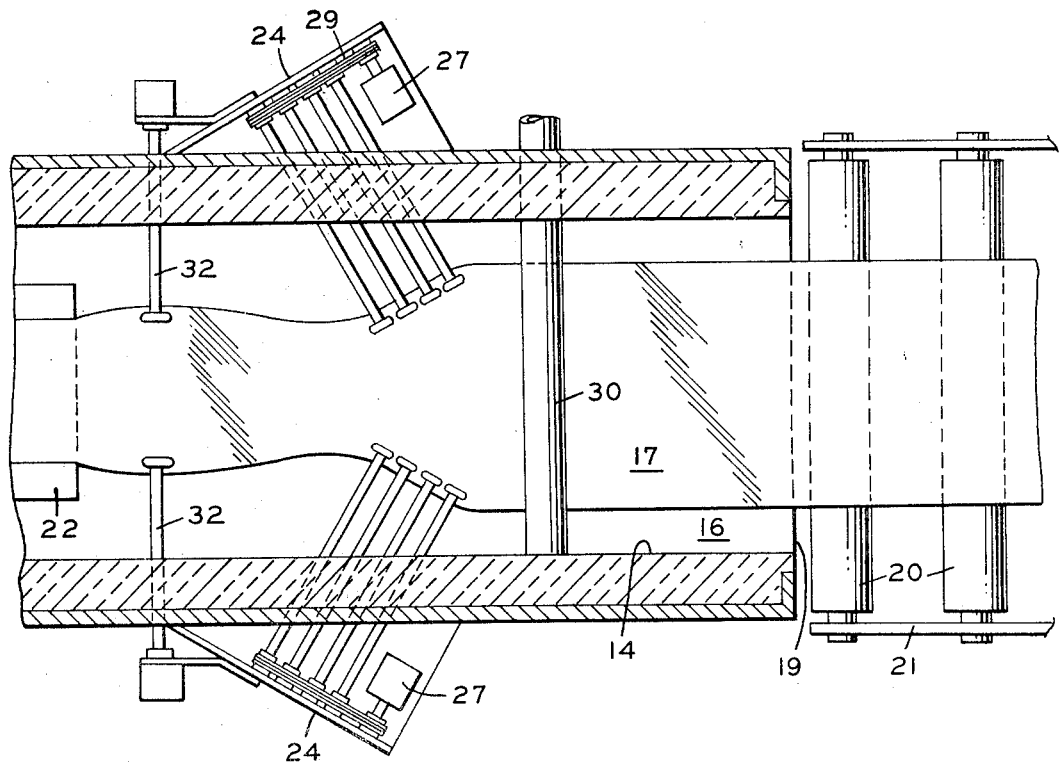
FIG. 6 is a view similar to FIG. 4 in which there is longitudinal stretching preceding lateral stretching.

In the method of FIG. 6, a pair of knurled rolls 32 are located to engage the ribbon after the two faces have flowed to substantial parallelism and preferably after flow to equilibrium thickness has taken place. The groups of knurled rolls 24, which are driven at a peripheral speed having a forward component greater than that of rolls 32, longitudinally stretch the ribbon between those rolls and the rolls 32. This longitudinal stretch is accomplished by necking down the width of the ribbon and reduction in thickness. The ribbon is stretched laterally by the rolls 24 in the manner of FIG. 4, after which the ribbon is cooled by the cooler 30 to prevent return towards equilibrium thickness.

While in all of the methods specifically described above, the glass has been permitted to come to equilibrium thickness by permitting it to flow laterally unrestrained under the influence of gravity and surface tension, which is a preferred way of practicing the invention, it is also to be understood that the glass can be laterally stretched almost immediately after the molten glass has been placed on the tin and as soon as the surfaces have come to parallelism and without waiting for or permitting flow to equilibrium width. This is accomplished by placing the first groups of knurled rolls close to the ramp 12, the remainder of the process being similar to that previously described.

What is claimed is:

1. A method for producing glass which comprises the steps of:

continuously delivering a quantity of molten glass to a molten metal bath housed in a glass processing chamber;

flowing said molten glass out upon said molten metal bath until the glass forms a ribbon of glass;

engaging opposite lateral edges of the ribbon with knurled rolls only on the surface of the ribbon of glass away from the molten metal bath, said knurled rolls contacting the lateral edges of the glass ribbon in directions generally diverging from the positions of the lateral edges just prior to the initial contact with said knurled rolls; and rotating said knurled rolls at a peripheral speed at least slightly greater than the linear speed of movement of the glass ribbon therepast whereby a tractive effort is applied to the glass ribbon by said rolls and a lateral stretching of the glass achieved;

cooling the ribbon of glass while the ribbon is in a stretched condition; and removing the cooled glass ribbon from the glass processing chamber.

2. A method for producing glass which comprises the steps of:

continuously delivering a quantity of molten glass to a molten metal bath housed in a glass processing chamber;

flowing said molten glass out upon said molten metal bath until the glass forms a ribbon of glass;

engaging opposite lateral edges of the ribbon with knurled rolls only on the surface of the ribbon of glass away from the molten metal bath, said knurled rolls contacting the surface of the glass ribbon in directions generally diverging from the center line of the glass ribbon moving therepast, and rotating said knurled rolls at a peripheral speed at least slightly greater than the linear speed of movement of the glass ribbon therepast whereby a tractive effort is applied to the glass ribbon by said rolls and a lateral stretching of the glass achieved;

cooling the ribbon of glass while the ribbon is in a stretched condition; and removing the cooled glass ribbon from the glass processing chamber.

3. A method for producing glass, the glass having a final thickness which is less than the equilibrium thickness obtained when molten glass is placed on a molten metal bath and allowed to cool thereupon in an unrestrained condition under the influence of gravity and surface tension to a temperature at which the glass is self-supporting, the method comprising the steps of:

continuously delivering a prescribed quantity of molten glass to a molten metal bath housed in a glass processing chamber;

flowing said molten glass out upon said molten metal bath until the glass forms a ribbon of glass of substantially equilibrium thickness;

engaging opposite lateral edges of the ribbon of glass with a first set of knurled rolls only on the surface of the ribbon of glass away from the molten metal bath, said knurled rolls engaging the surface of the glass ribbon is directions generally diverging from the center line of the glass ribbon moving therepast, and rotating said knurled rolls at a peripheral speed at least slightly greater than the linear speed of movement of the glass ribbon therepast whereby a tractive effort is applied to the glass ribbon by said rolls and a lateral stretching of the glass achieved to decrease the thickness of the ribbon to less than equilibrium thickness;

cooling the ribbon of glass while the ribbon is in a stretched condition to a temperature whereat the glass will not return to an equilibrium condition if unrestrained thereby to form a self-supporting glass ribbon having a thickness less than equilibrium thickness; and removing the self-supporting glass ribbon from the glass processing chamber.

4. The method for producing glass as defined in claim 3 wherein, simultaneously with the engaging of the surface of the glass ribbon with and the rotation of said first set of knurled rolls, the glass ribbon is engaged by annealing lehr rolls, and wherein said annealing lehr rolls are rotated at a peripheral speed at least slightly greater than the liner speed of movement of the glass ribbon past said knurled rolls whereby the glass ribbon is also subject to a tractive effort in the direction of movement of the ribbon so that a simultaneous lateral and longitudinal stretching of the glass ribbon is achieved.

5. The method for producing glass as defined in claim 3 wherein said glass ribbon is engaged by a second set of knurled rolls spaced from said first set of knurled rolls in a direction along the length of travel of the glass ribbon, said second set of knurled rolls engaging only the surface of the glass ribbon away from the molten metal bath in directions generally diverging from the center line of the glass ribbon moving therepast, and wherein said second set of knurled rolls is rotated at a peripheral speed at least slightly greater than the peripheral speed of said first set of knurled rolls whereby the glass ribbon is (1) laterally stretched by said first set of knurled rolls, (2) longitudinally stretched between said two sets of knurled rolls, and (3) laterally stretched by said second set of knurled rolls.

6. The method for producing glass as defined in claim 3 wherein said glass ribbon is initially engaged by a set of knurled rolls which engage only the surface of the glass ribbon away from the molten metal bath in directions generally parallel to the center line of the glass ribbon moving therepast, and wherein said initial rolls are rotated at a peripheral speed less than the peripheral speed of said first set of knurled rolls whereby the glass ribbon is (1) longitudinally stretched between said initial rolls and said first set of knurled rolls and (2) laterally stretched by said first set of knurled rolls.

References Cited

UNITED STATES PATENTS

| | | | |
|---|---|---|---|
| 3,241,937 | 3/1966 | Michalik | 65—99 |
| 3,356,479 | 12/1967 | Galey | 65—99 |
| 3,432,283 | 3/1969 | Galey | 65—65 |

OTHER REFERENCES

Plumat: South Africa, complete specification, Nov. 18, 1963, No. 635,217.

S. LEON BASHORE, Primary Examiner

E. R. FREEDMAN, Assistant Examiner

U.S. Cl. X.R.

65—65, 99, 182, 200